(12) United States Patent
Rahmes et al.

(10) Patent No.: US 7,487,046 B2
(45) Date of Patent: *Feb. 3, 2009

(54) GEOSPATIAL MODELING SYSTEM FOR PERFORMING FILTERING OPERATIONS BASED UPON A SUM OF DIFFERENCES OF A GIVEN AND NEIGHBORING LOCATION POINTS AND RELATED METHODS

(75) Inventors: Mark Rahmes, Melbourne, FL (US); Stephen Connetti, Melbourne, FL (US); Harlan Yates, Melbourne, FL (US); Anthony O'Neil Smith, Gainesville, FL (US)

(73) Assignee: Harris Corporation, Melbourne, FL (US)

( * ) Notice: Subject to any disclaimer, the term of this patent is extended or adjusted under 35 U.S.C. 154(b) by 265 days.

This patent is subject to a terminal disclaimer.

(21) Appl. No.: 11/463,414

(22) Filed: Aug. 9, 2006

(65) Prior Publication Data

US 2008/0040349 A1 Feb. 14, 2008

(51) Int. Cl.
*G01V 3/38* (2006.01)
(52) U.S. Cl. ............... 702/5; 382/294; 702/152
(58) Field of Classification Search .............. 702/5, 702/6, 152; 342/22, 140; 345/7, 419; 375/240.08; 382/109, 294; 706/58
See application file for complete search history.

(56) References Cited

U.S. PATENT DOCUMENTS

| 6,597,818 | B2 | 7/2003 | Kumar et al. ............... 382/294 |
| 6,654,690 | B2 | 11/2003 | Rahmes et al. ................. 702/5 |
| 6,954,498 | B1 | 10/2005 | Lipton ................... 375/240.08 |
| 7,292,941 | B1* | 11/2007 | Rahmes et al. ................. 702/5 |
| 7,376,513 | B2* | 5/2008 | Rahmes et al. ................. 702/5 |
| 2003/0014224 | A1 | 1/2003 | Guo et al. ..................... 703/1 |
| 2004/0041805 | A1 | 3/2004 | Hayano et al. ............. 345/419 |

OTHER PUBLICATIONS

Verdera et al., *Inpainting Surface Holes*, May 2, 2003.

* cited by examiner

*Primary Examiner*—John H Le
(74) *Attorney, Agent, or Firm*—Allen, Dyer, Doppelt, Milbrath & Gilchrist, P.A.

(57) ABSTRACT

A geospatial modeling system may include a geospatial model database and a processor cooperating therewith for performing at least one noise filtering operation on data comprising elevations associated with respective location points. The at least one noise filtering operation may include determining a respective center point elevation difference for each location point and based upon a sum of differences between elevations of a given location point and a plurality of neighboring location points.

29 Claims, 14 Drawing Sheets

GEOSPATIAL MODELING SYSTEM FOR PERFORMING FILTERING OPERATIONS BASED UPON A SUM OF DIFFERENCES OF A GIVEN AND NEIGHBORING LOCATION POINTS AND RELATED METHODS

FIELD OF THE INVENTION

The present invention relates to the field of topographical modeling, and, more particularly, to geospatial modeling systems and related methods

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEN no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques, RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

One potentially challenging aspect of generating geospatial models such as DEMS is distinguishing different types of geospatial data, e.g., foliage data and building data. This is because foliage such as trees results in noisy data (e.g., LIDAR data) because of the varying heights and contours of the leaves, etc. Even though buildings generally provide relatively smooth data towards the centers of the buildings, the edges of the buildings where a transition from roof to ground occurs often produces noisy data as well. Moreover, foliage is often placed directly adjacent to or overlies buildings, which makes distinguishing the two using automated computer processing techniques particularly challenging. As a result, if an operator wants to separate foliage and building data to provide a model of just one or the other types of data, the operator may have to manually designate foliage and buildings in a raw image data scene. However, this can be extremely time consuming and, thus, cost prohibitive in many applications.

SUMMARY OF THE INVENTION

In view of the foregoing background, it is therefore an object of the present invention to provide a geospatial modeling system having geospatial data type separation features and related methods.

This and other objects, features, and advantages are provided by a geospatial modeling system which may include a geospatial model database and a processor. The processor may cooperate with the geospatial model database for performing at least one noise filtering operation on data comprising elevations associated with respective location points. More particularly, the at least one noise filtering operation may include determining a respective center point elevation difference for each location point and based upon a sum of differences between elevations of a given location point and a plurality of neighboring location points.

The data may include ground data and foliage data, for example. As such, data processor may further separate the ground data from the foliage data based upon the at least one noise filtering operation. The at least one noise filtering operation may include a first loose tolerance filtering to determine an inclusive estimate of building locations, and a second strict tolerance filtering to reduce false building locations. Also, the processor may further perform at least one edge recovery operation to compensate for noisy building perimeters. In addition, the processor may perform a masking operation based upon the inclusive estimate of the building locations to generate masked building data. The at least one noise filtering operation may further include a third filtering based upon the masked building data and the output of the second strict tolerance filtering.

By way of example, the plurality of neighboring location points comprises eight neighboring location points. Furthermore, the at least one sum of differences operation may also include determining a respective neighboring points elevation difference for each pair of adjacent location points based upon a sum of differences between elevations of respective center point elevation differences for the adjacent location points. The at least one noise filtering operation may further include selectively replacing foliage and building data points with nulls based upon the at least one sum of differences operation and an elevation difference threshold. The geospatial modeling system may also include a display coupled to the processor for displaying at least one of the separated foliage and building data.

A geospatial modeling method aspect may include performing at least one noise filtering operation on data comprising elevations associated with respective location points using a processor. More particularly, the at least one noise filtering operation may include determining a respective center point elevation difference for each location point and based upon a sum of differences between elevations of a given location point and a plurality of neighboring location points.

A computer-readable medium may have computer executable modules including a geospatial model database module and a processing module cooperating therewith for performing at least one noise filtering operation on data comprising elevations associated with respective location points. Moreover, the at least one noise filtering operation may include determining a respective center point elevation difference for each location point and based upon a sum of differences between elevations of a given location point and a plurality of neighboring location points.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
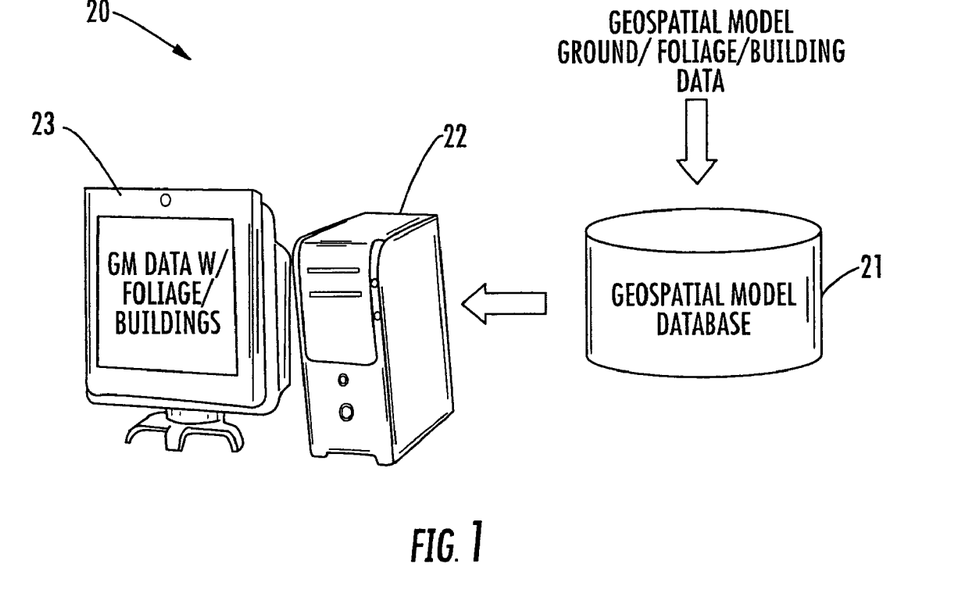
FIG. 1 is a schematic block diagram of a geospatial model system in accordance with the invention.

Referring initially to FIG. 1, a geospatial modeling system 20 illustratively includes a geospatial model database 21 and a processor 22 that may advantageously be used for separating different types of geospatial data, such as building and foliage data, for example. By way of example, the processor 22 may be a central processing unit (CPU) of a PC, Mac, or other computing workstation, for example. A display 23 may also be coupled to the processor 22 for displaying geospatial modeling data, as will be discussed further below. The processor 22 may be implemented using a combination of hardware and software components/modules to perform the various operations that will be discussed further below, as will be appreciated by those skilled in the art.

By way of example, the geospatial data may be captured using various techniques such as stereo optical imagery, Light. Detecting and Ranging (LIDAR), Interferometric Synthetic Aperture Radar (IFSAR), etc. Generally speaking, the data will be captured from overhead (e.g., nadir) views of the geographical area of interest by airplanes, satellites, etch, as will be appreciated by those skilled in the art. However, oblique images of a geographical area of interest may also be used in addition to (or instead of) the nadir images to add additional 3D detail to a geospatial model. The raw image data captured using LIDAR, etc., may be processed upstream from the geospatial model database 21 into a desired format, such as a digital elevation model (DEM), or this may be done by the processor 22.

Turning additionally to FIGS. 2 through 15, a method for separating foliage data from the building data using the system 20 is now described. Initially, a DEM 50 (FIG. 6) of a given geographical area of interest or scene is generated, at Block 30. By way of example, the above-described RealSite® system or the system set forth in U.S. Pat. No. 6,654,690 may be used for generating the initial DEM. Of course, other suitable approaches for generating DEMs may also be used. The DEM 50 may be generated by another computer and stored in the geospatial model database 21, or it may be created by the processor 22 based upon "raw" geospatial data (e.g., LIDAR data, etc.) stored in the database. The DEM 50 illustratively includes terrain (i.e., ground), buildings, and foliage data. Yet, in some applications it is desirable to separate one of these types of data, such as the building or foliage data, from the remainder of the DEM data so that it can be viewed and/or processed individually.

Figure 2:
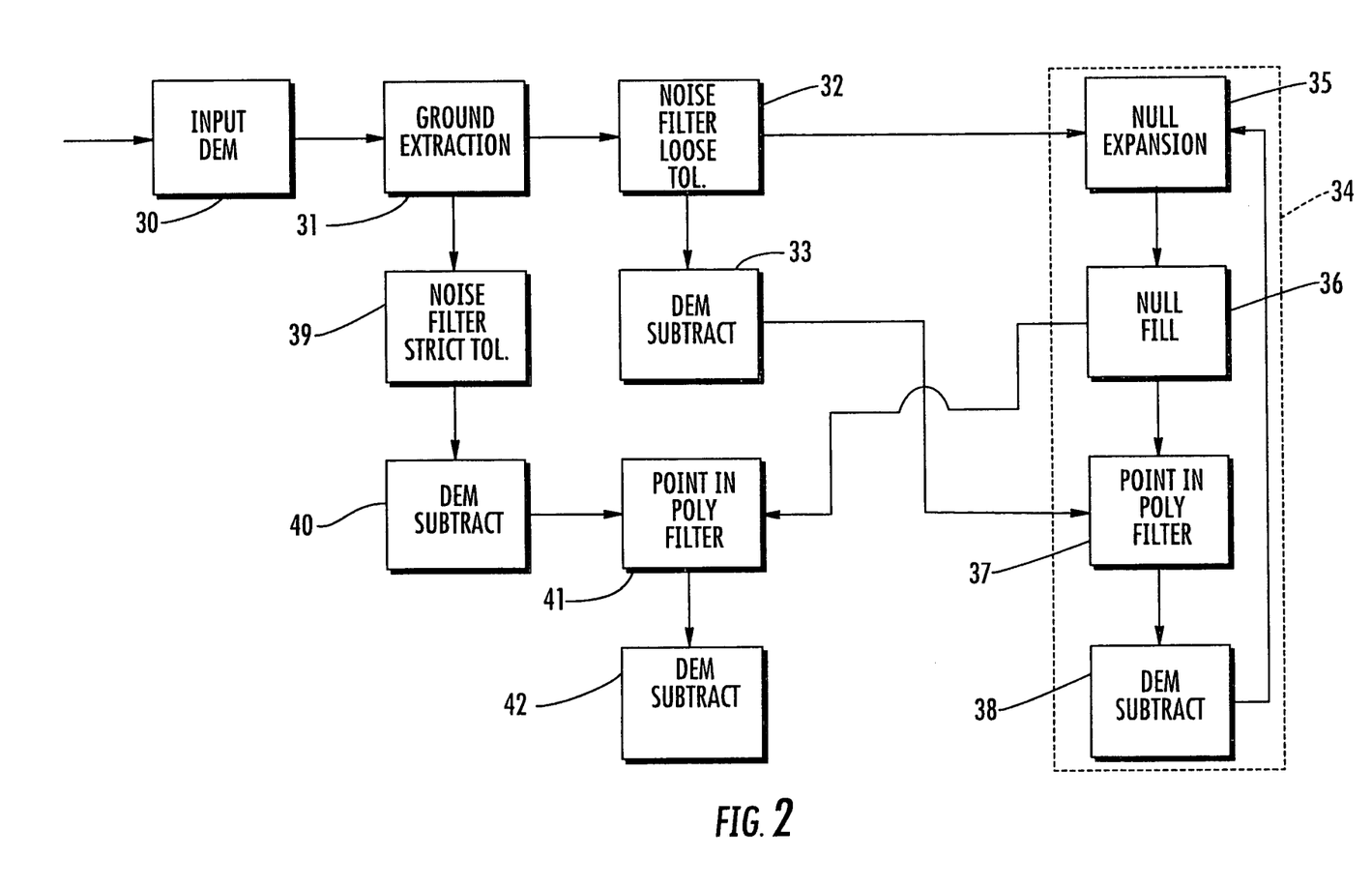
FIG. 2 is a flow diagram illustrating a geospatial modeling method in accordance with the invention for separating building and foliage geospatial data.

To this end, a first step of extracting ground data from foliage and building data is performed by the processor 22, at Block 31, to generate foliage and building data 51. As will be appreciated by those skilled in the art, the foliage, building, and ground data include elevations or heights associated with respective location points or posts.

Figure 3:
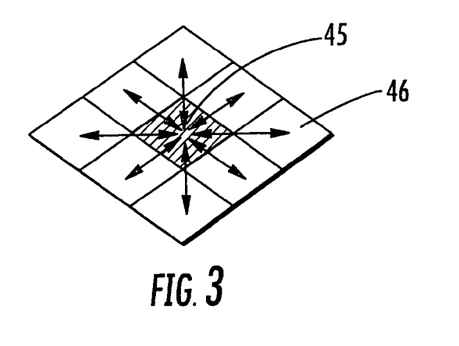
FIGS. 3-5 are 3D grid views illustrating sum of difference filtering operations in accordance with the method of FIG. 2.

Following the ground extraction, a first filtering operation is performed on the foliage and building data 51 using a first loose tolerance to determine an inclusive estimate of building locations 52, at Block 32. Referring more particularly to FIG. 3, the filtering operation includes defining a center location point 45 and its neighboring location points 46. Then, the processor 22 performs a sum of differences operation which includes determining a respective center point 45 elevation difference based upon a sum of differences between elevations of the center point and the neighboring location points 46, where:

$$CenterDifference = \sum_{i=-1}^{1} \sum_{j=-1}^{1} |x_{i,j} - x_{o,o}|. \quad (1)$$

In the illustrated embodiment, eight neighboring location points 46 are used, but in other embodiments more or less neighboring location points may be used. The above-described sum of differences operation is performed for each of the foliage and building data location points within the DEM. That is, each location point is defined as a center and the sum of differences with respect to its neighboring location points is determined in accordance with equation (1).

Figure 4:
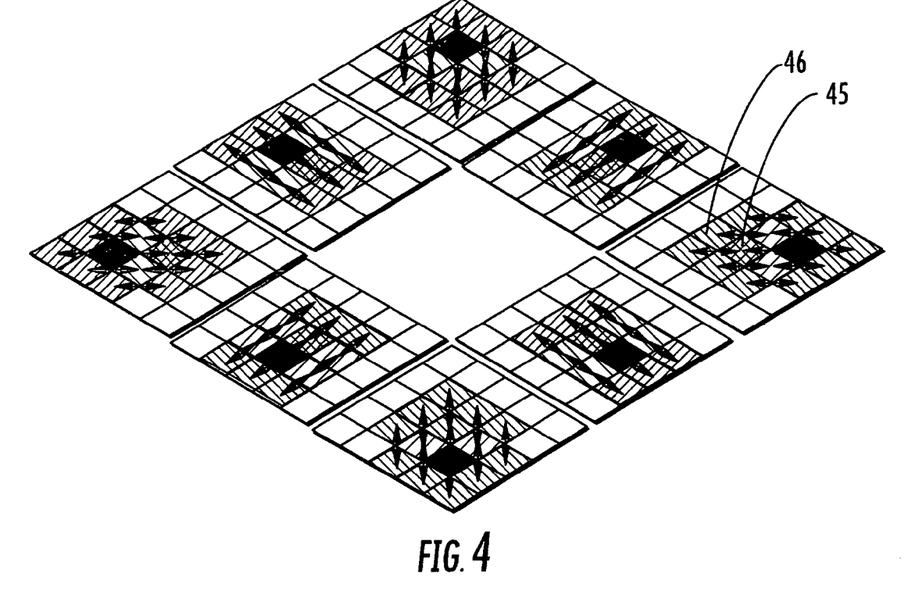

The filtering operation further includes determining a respective neighboring points 46 elevation difference for each pair of adjacent location points based upon a sum of differences between elevations of respective center point elevation differences for the adjacent location points. That is, given two adjacent location points, a sum of differences is determined between the two location point elevations relative to the original location point elevations (FIG. 4). In the present example, there will be eight non-trivial neighbor differences per each center location point, where:

$$NeighborDifference_{di,dj} = \sum_{i=-1}^{1} \sum_{j=-1}^{1} |x_{i,j} - x_{i+di,j+dj}|. \quad (2)$$

Figure 5:
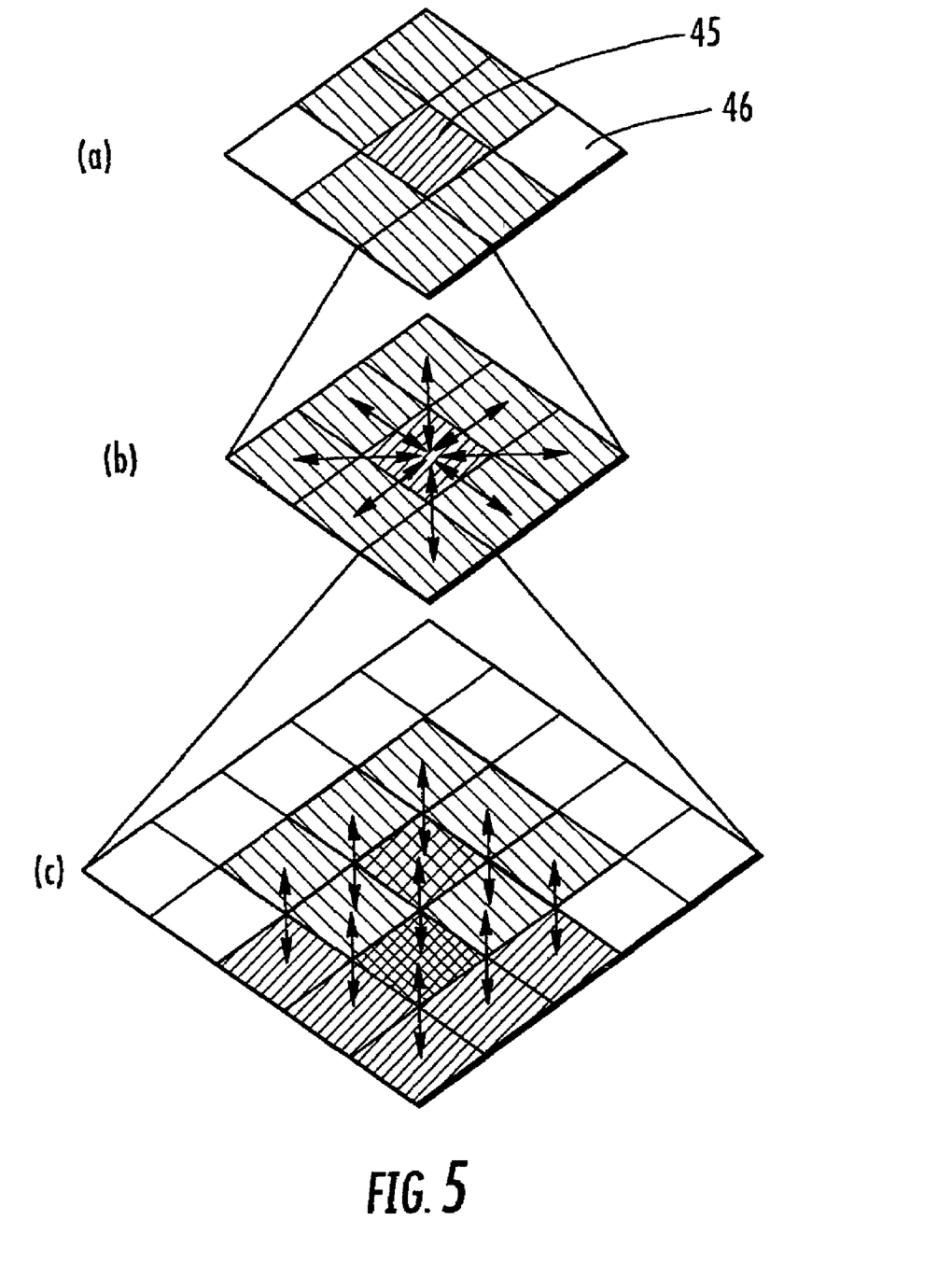
Figure 6:
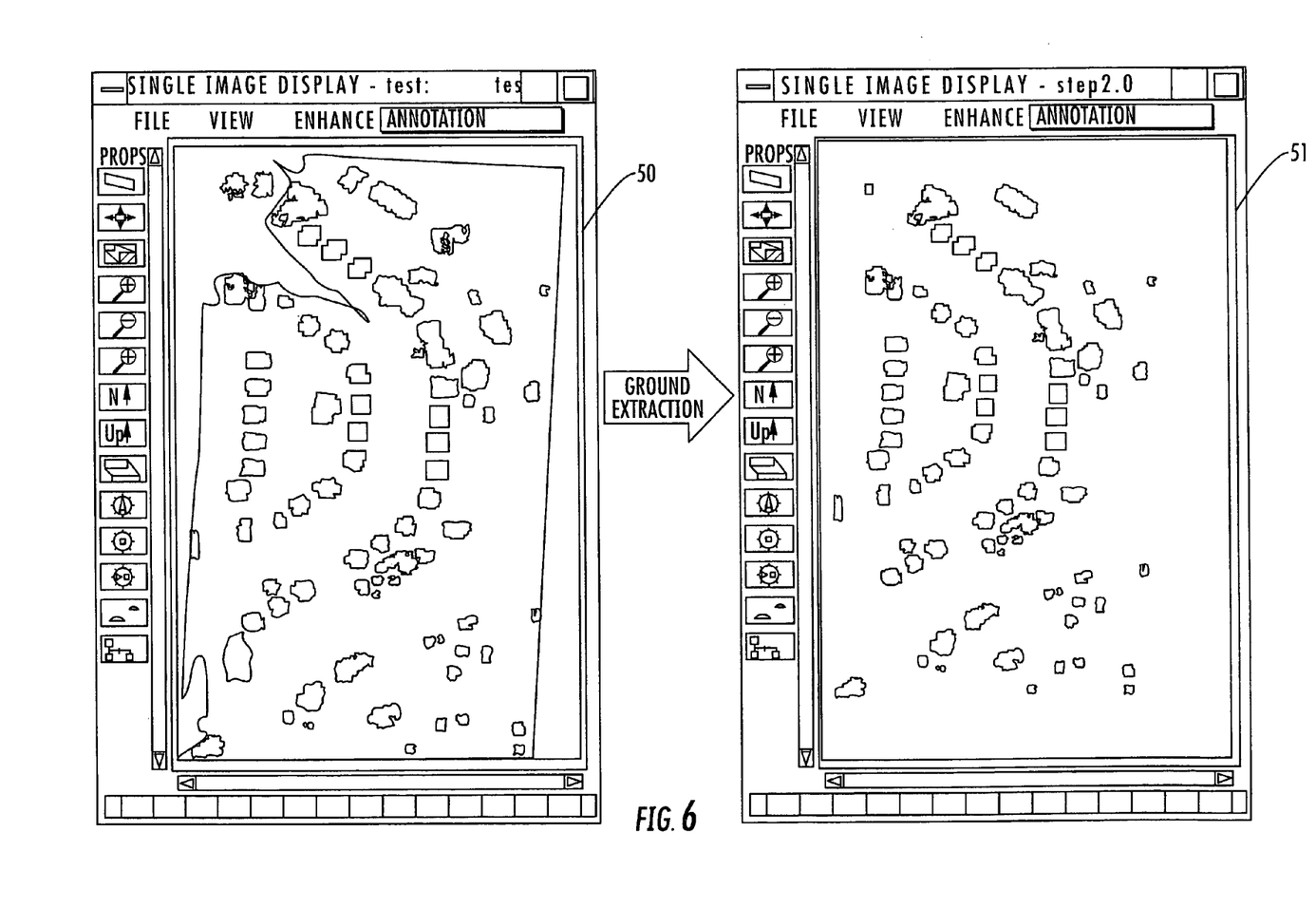
FIGS. 6-15 are a series of screen prints illustrating various aspects of the method of FIG. 2.
Figure 7:
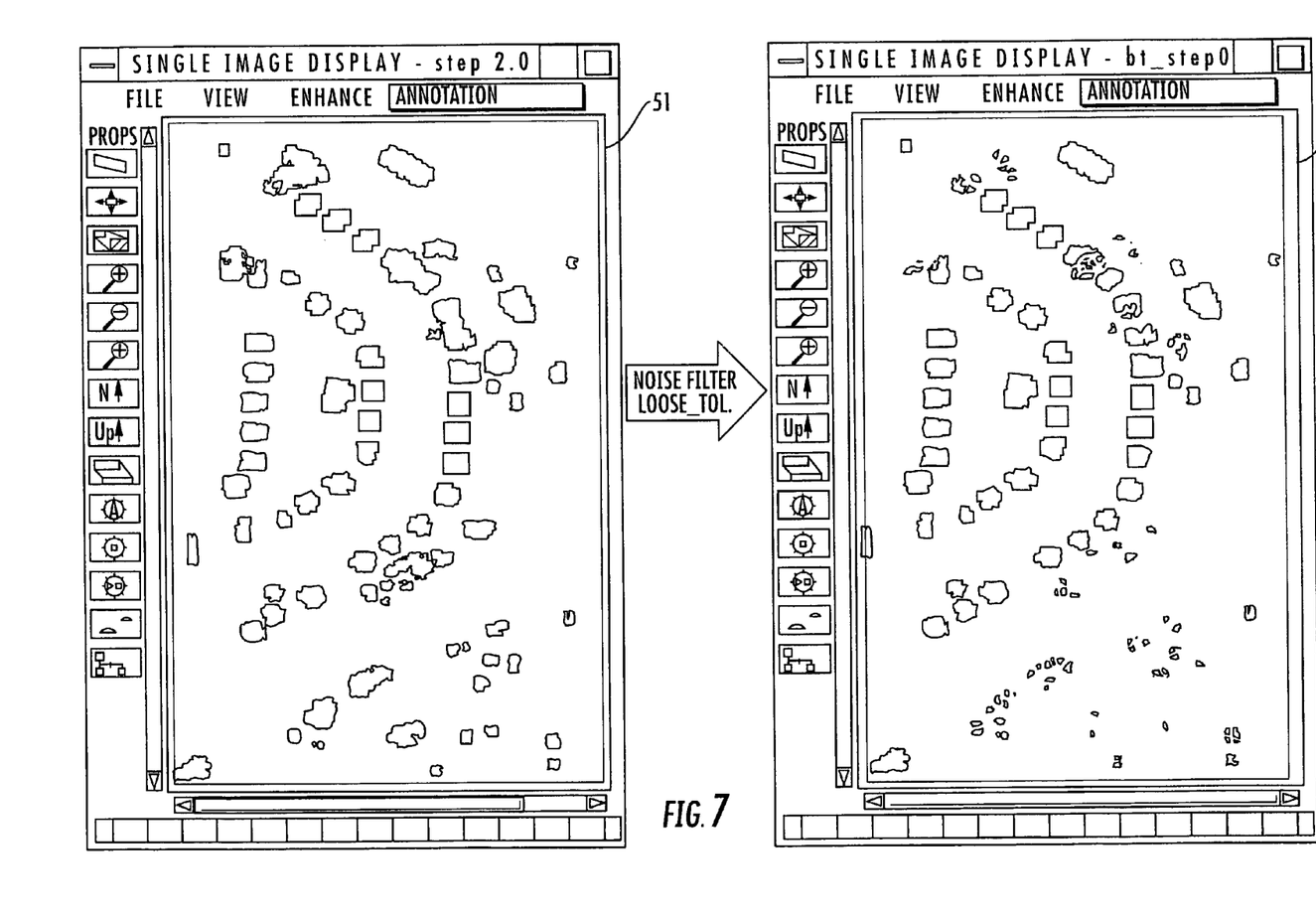
Figure 8:
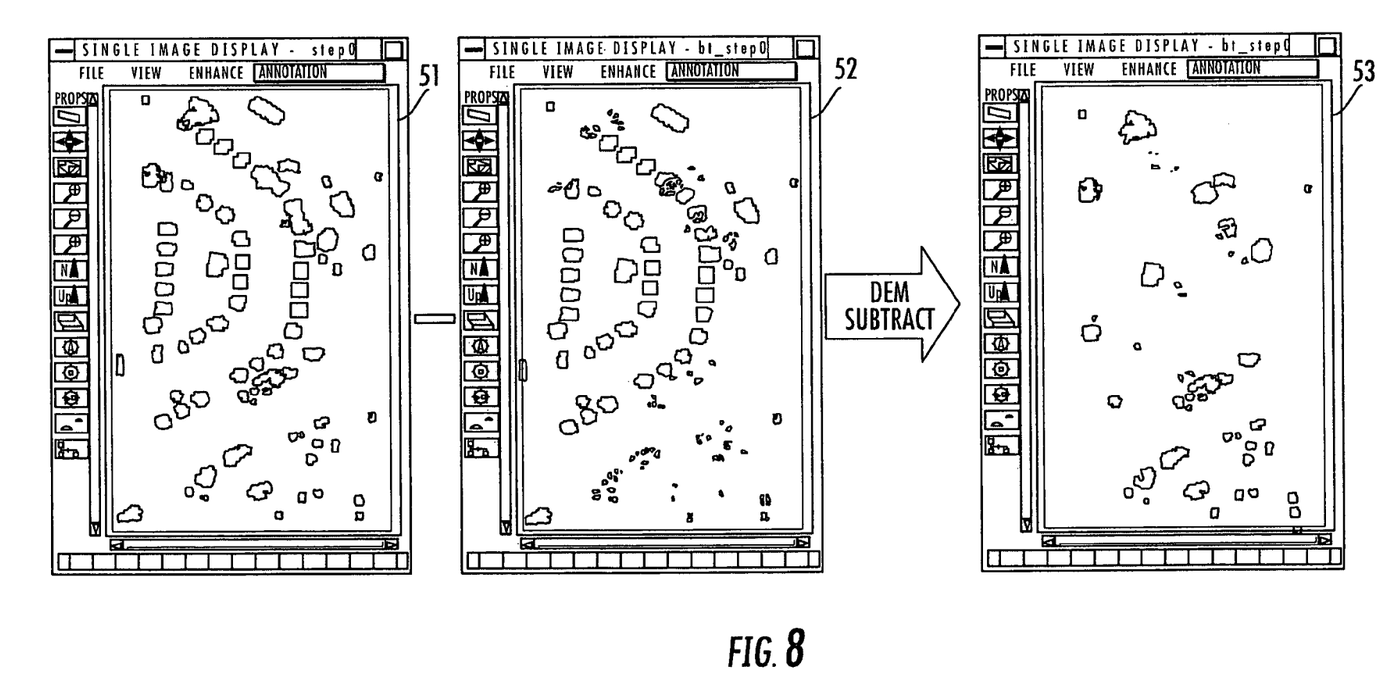
Figure 9:
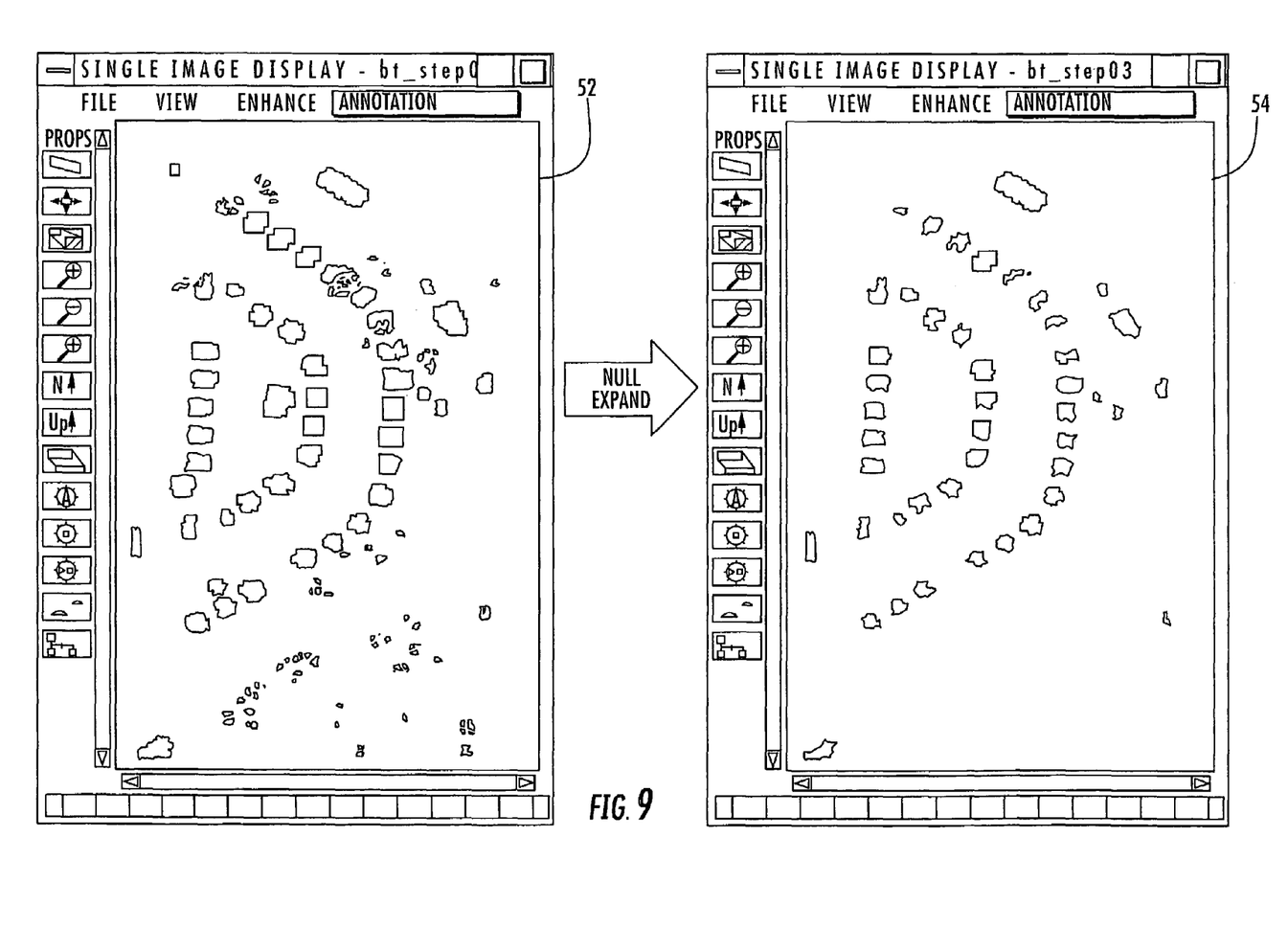

Once the neighboring points elevation differences are determined, then six adjacent points are identified that are not on a primary diagonal (indicated by shading in FIG. 5($a$)) for a given center point 45. The eight-neighbor difference is then determined for each of the six adjacent points (FIG. 5(b)), as is a center difference of each set of the eight neighbor differences (FIG. 5(c)). A self-similarity is determined to be the smallest center difference, where higher values correspond to larger differences.

The above-described filtering operation allows a "rough" estimation of the foliage in the building and foliage data DEM 51, which can then be separated from the building data to provide the inclusive estimate of building locations 52. Stated alternatively, using a loose tolerance filtering will identify a large portion of the foliage, but will intentionally allow some foliage data to remain (which appear as small spots or speckles in FIG. 7) so that little or no building data is excluded Next, a DEM subtract operation is performed, at Block 33, in which the inclusive estimate of building locations 52 is "subtracted" from the building and foliage data 51 to provide a preliminary estimate of the foliage 53. The processor 22 may then begin edge recovery operations, as indicated by the dashed box 34 in FIG. 2, to compensate for noisy building perimeters. More particularly, the first edge recovery operation includes a null expansion on the inclusive estimate of building locations 52, at Block 35, to remove the foliage remnants (i.e., specks) therein (FIG. 9), and produce an estimate of the buildings without specks 54.

Figure 10:
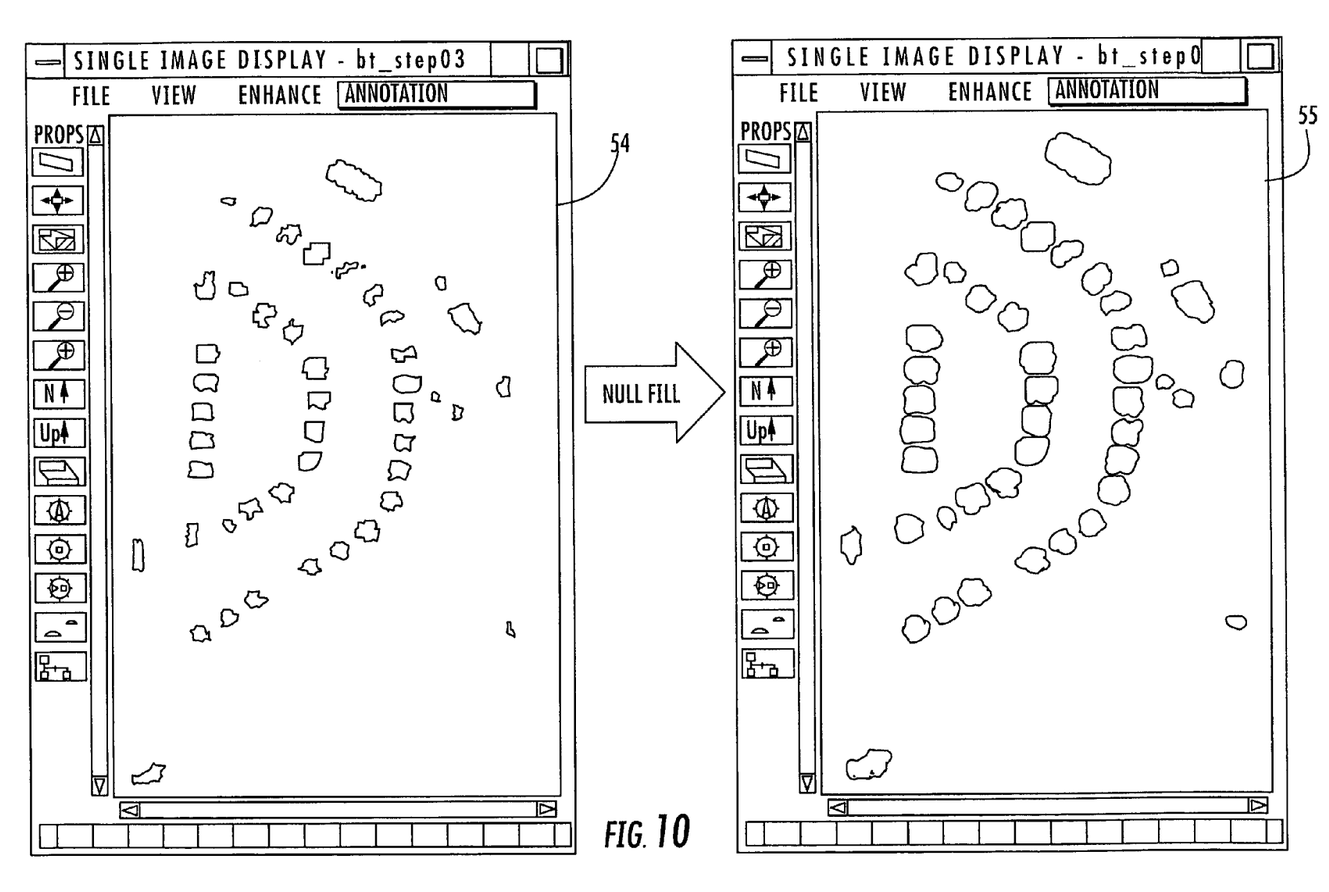
Figure 11:
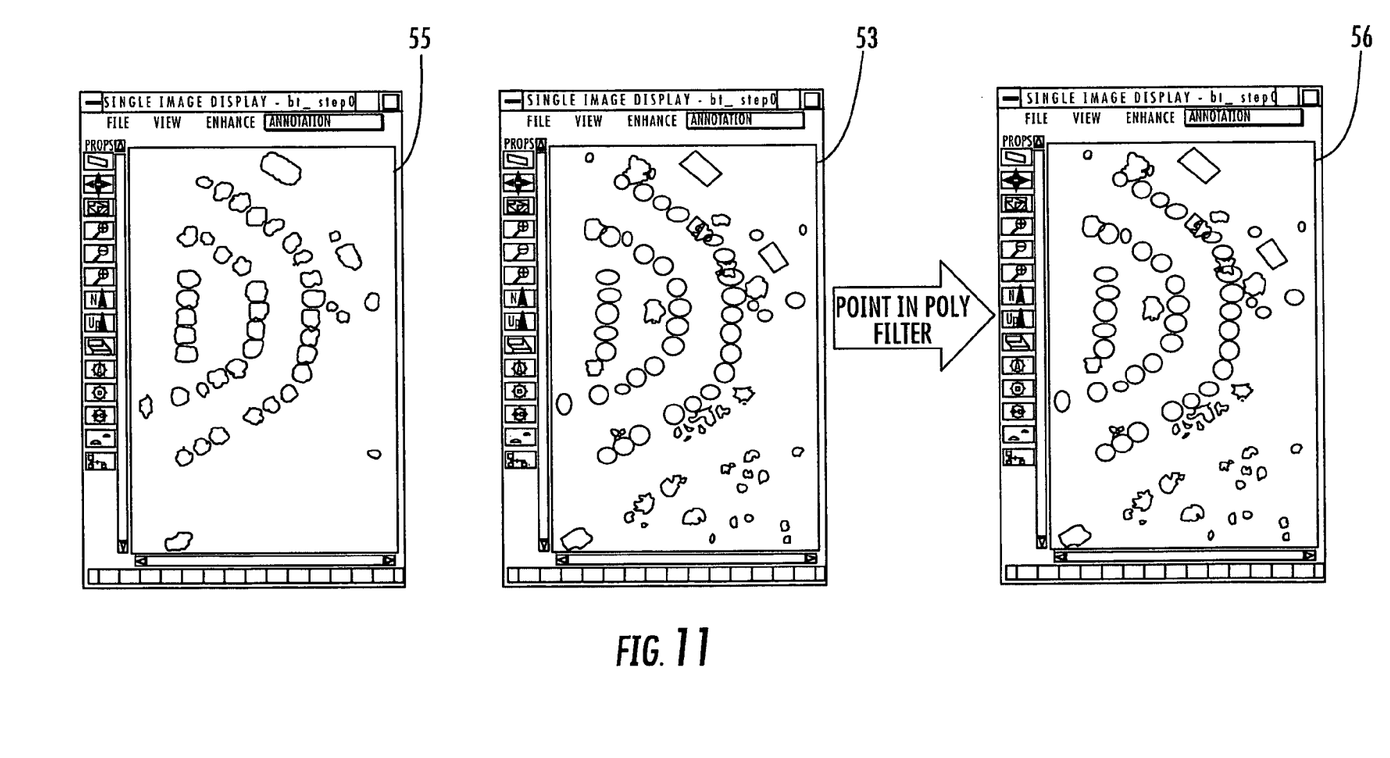
Figure 12:
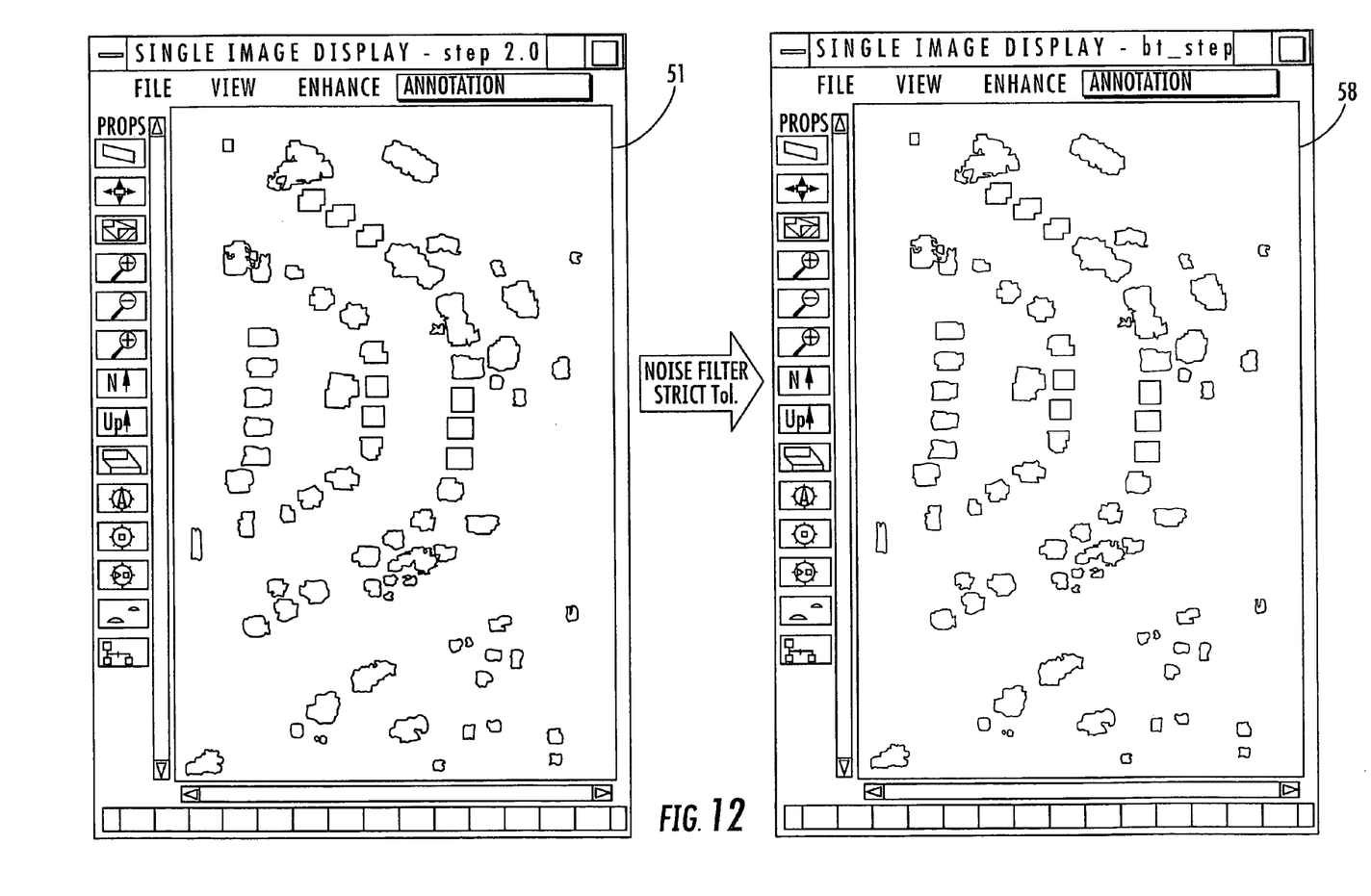

The processor 22 may then perform a null filling operation on the estimate of buildings without specks 54 to generate a mask of building data 55 (FIG. 10). That is, the null filling approximates geometric shapes of the buildings, which are shown in FIG. 11. The mask of building data 55 and the preliminary estimate of the foliage 53 are then used to perform a point in poly filtering operation to generate an improved estimate of the foliage 56. A next edge recovery operation includes a DEM subtract operation, namely subtracting the improved estimate of the foliage 56 from the building and foliage data 51 to get an improved estimate of the building data, at Block 38. The above-described edge recovery operations may then be repeated one or more times, depending upon the desired accuracy for a given implementation, to produce a final mask of building data 57 that will be used in a later step.

In addition, a second strict tolerance filtering is also performed on the building and foliage data 51 to reduce false building locations, and this filtering produces a second estimate of the building data 58, at Block 39. More particularly, the second filtering operation is similar to the first filtering operation described above with reference to FIGS. 3-5, but a more tight or strict tolerance is used. The relative values of the strict and loose tolerance thresholds used in the filtering operations may be determined based upon factors such as the type of data being processed, data resolution, and the desired accuracy of the resulting building and/or foliage data, for example, as will be appreciated by those skilled in the art.

Figure 13:
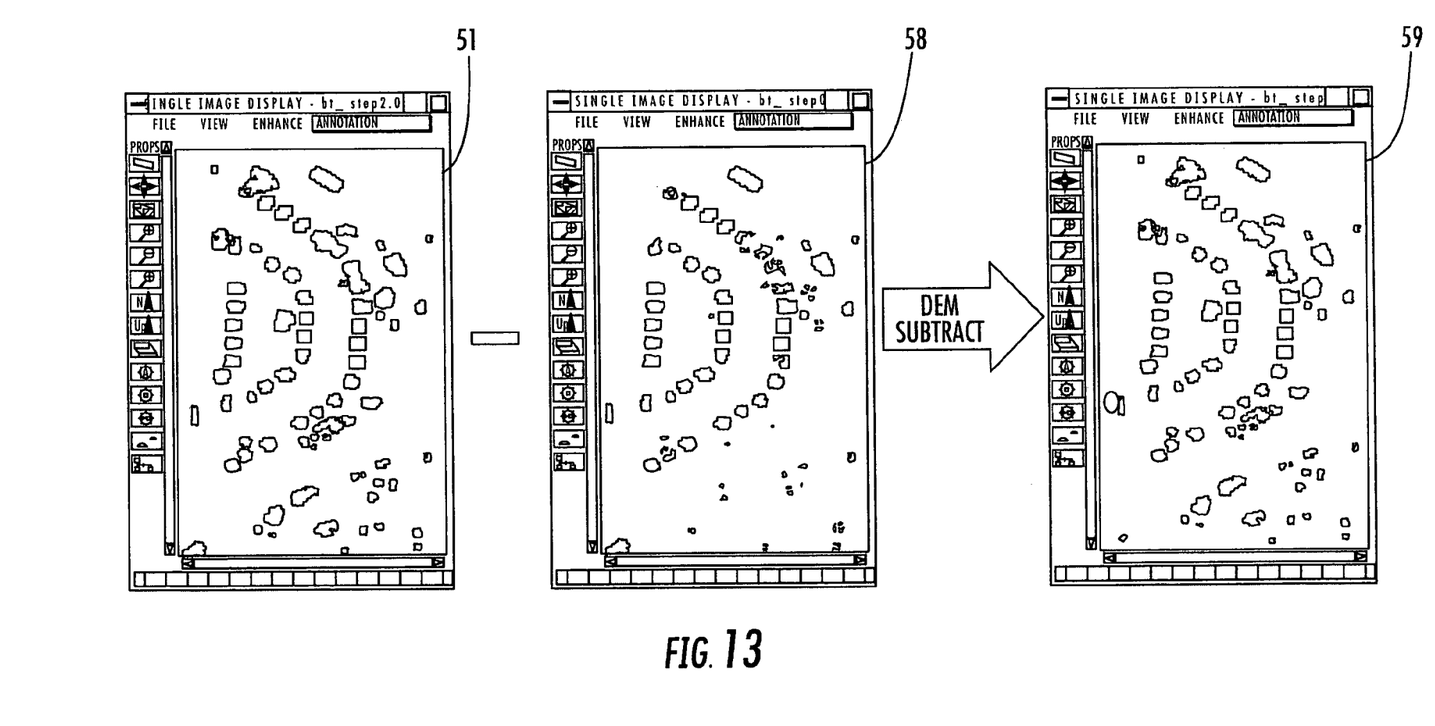
Figure 14:
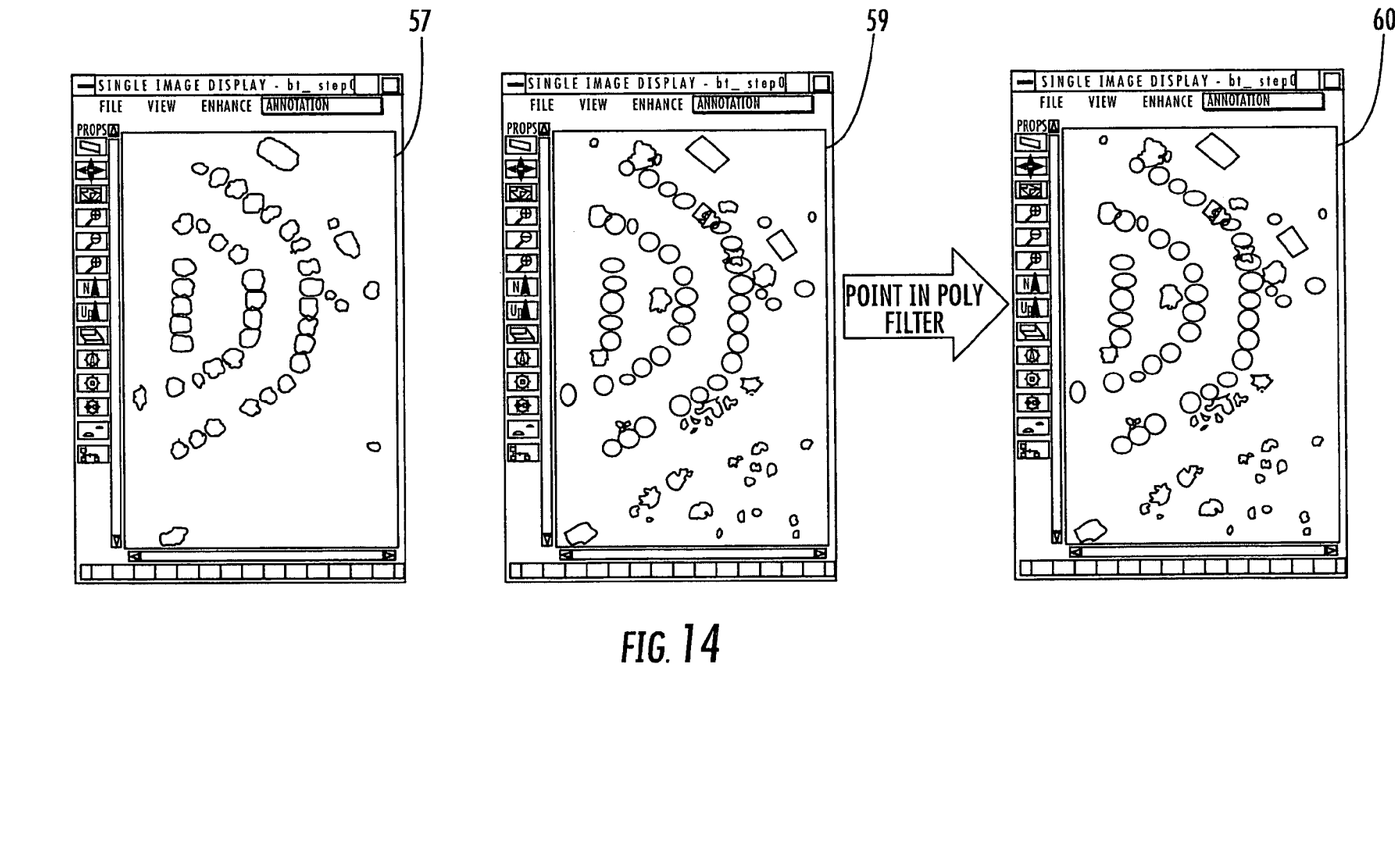
Figure 15:
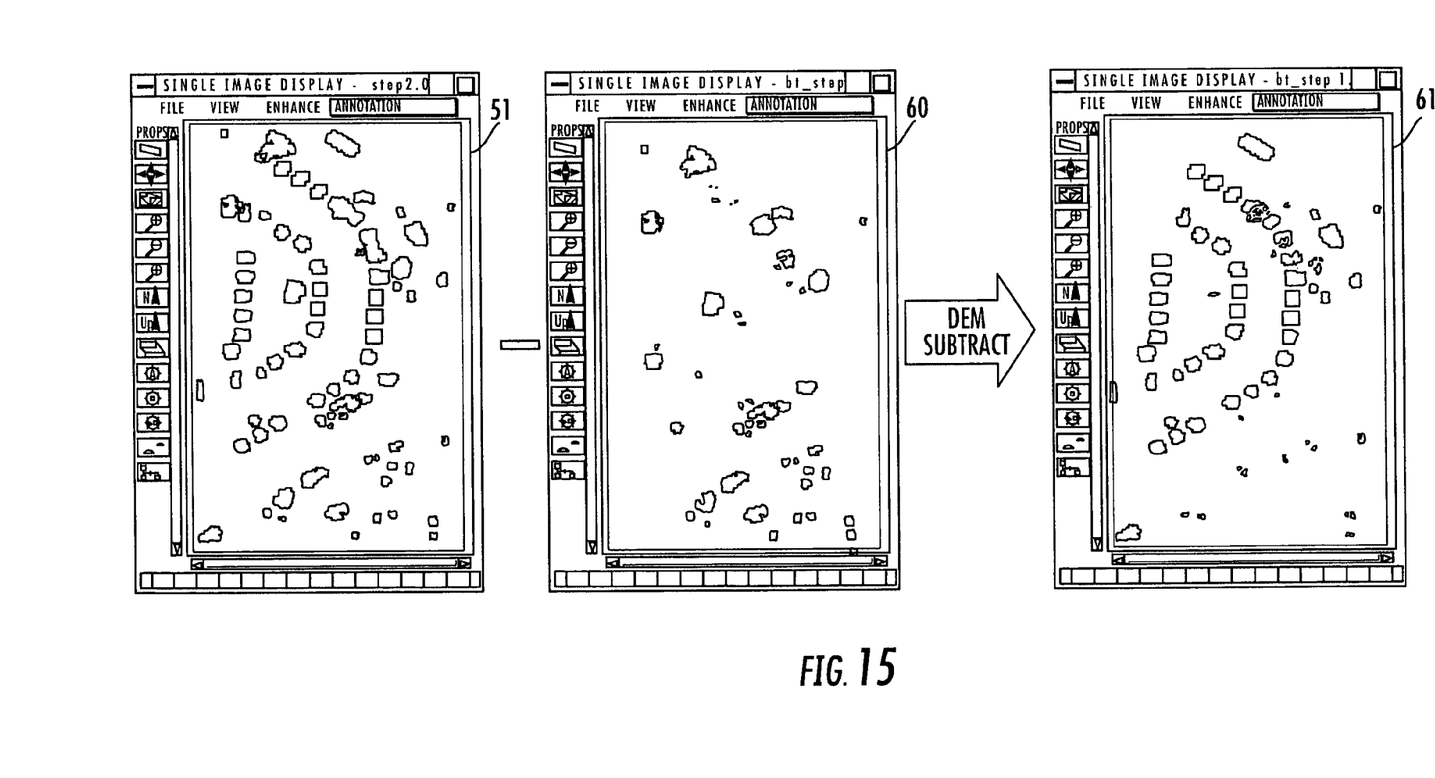

A DEM subtract operation is then performed based upon the building and foliage data 51 and the second estimate of building data 58 to provide a second estimate of the foliage data 59, at Block 40 (FIG. 13). Another point in poly filtering operation is then performed, at Block 41, based upon the second estimate of the foliage data 59 and the final mask of building data 57 to produce a final estimate of the foliage data 60. Then, another DEM subtract operation may be performed using the building and foliage data 51 and the final estimate of the foliage data 60 to generate a final building data estimate 61, at Block 42. The processor 22 may then selectively display the final separated foliage data 60 or the final building data 61 on the display 23, or it may be stored for further processing or usage.

In summary, the above-described approach advantageously uses a center location point difference of neighbor differences as a noise metric, as well as an edge recovery routine to compensate for noisy building parameters. Furthermore, use of a loose tolerance to obtain a general idea of where the buildings are, and then a strict tolerance to help reduce the changes of false buildings, provides still further accuracy. However, it will be appreciated that in certain embodiments some of the above-described operations may be omitted or performed in an order different than shown or described.

The above-described approach may advantageously provide the ability to automatically detect and/or distinguish foliage from underlying terrain and man-made (i.e., building) structures within a DEM, and model them separately. It may further allow modeling of foliage as 3D point (i.e., voxels), as well as the modeling of man-made structures and terrain as polygons.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
   a geospatial model database; and
   a processor cooperating with said geospatial model database for performing at least one noise filtering operation on data comprising elevations associated with respective location points;
   the at least one noise filtering operation comprising determining a respective center point elevation difference for each location point and based upon a sum of differences between elevations of a given location point and a plurality of neighboring location points.

2. The geospatial modeling system of claim 1 wherein the data comprises ground data and foliage data.

3. The geospatial modeling system of claim 2 wherein said processor further separates the ground data from the foliage data based upon the at least one noise filtering operation.

4. The geospatial modeling system of claim 1 wherein the at least one noise filtering operation comprises a first loose tolerance filtering to determine an inclusive estimate of building locations, and a second strict tolerance filtering to reduce false building locations.

5. The geospatial modeling system of claim 4 wherein said processor further performs at least one edge recovery operation to compensate for noisy building perimeters.

6. The geospatial modeling system of claim 4 wherein said processor further performs a masking operation based upon the inclusive estimate of the building locations to generate masked building data.

7. The geospatial modeling system of claim 6 wherein the at least one noise filtering operation further comprises a third filtering based upon the masked building data and the output of the second strict tolerance filtering.

8. The geospatial modeling system of claim 1 where the plurality of neighboring location points comprises eight neighboring location points.

9. The geospatial modeling system of claim 1 wherein the at least one sum of differences operation further comprises determining a respective neighboring points elevation difference for each pair of adjacent location points based upon a sum of differences between elevations of respective center point elevation differences for the adjacent location points.

10. The geospatial modeling system of claim 1 wherein the at least one noise filtering operation further comprises selectively replacing foliage and building data points with nulls based upon the at least one sum of differences operation and an elevation difference threshold.

11. The geospatial modeling system of claim 1 further comprising a display coupled to said processor for displaying at least one of the separated foliage and building data.

12. A geospatial modeling method comprising:
performing at least one noise filtering operation on data comprising elevations associated with respective location points using a processor;
the at least one noise filtering operation comprising determining a respective center point elevation difference for each location point and based upon a sum of differences between elevations of a given location point and a plurality of neighboring location points.

13. The method of claim 12 wherein the data comprises ground data and foliage data.

14. The method of claim 13 further comprising separating the ground data from the foliage data based upon the at least one noise filtering operation using the processor.

15. The method of claim 12 wherein the at least one noise filtering operation comprises a first loose tolerance filtering to determine an inclusive estimate of building locations, and a second strict tolerance filtering to reduce false building locations.

16. The method of claim 15 further comprising performing at least one edge recovery operation using the processor to compensate for noisy building perimeters.

17. The method of claim 15 further comprising performing a masking operation using the processor based upon the inclusive estimate of the building locations to generate masked building data.

18. The method of claim 17 wherein the at least one noise filtering operation further comprises a third filtering based upon the masked building data and the output of the second strict tolerance filtering.

19. The method of claim 12 wherein the at least one sum of differences operation further comprises determining a respective neighboring points elevation difference for each pair of adjacent location points based upon a sum of differences between elevations of respective center point elevation differences for the adjacent location points.

20. The method of claim 12 wherein the at least one noise filtering operation further comprises selectively replacing foliage and building data points with nulls based upon the at least one sum of differences operation and an elevation difference threshold.

21. A computer-readable medium having computer executable modules comprising:
a geospatial model database module; and
a processing module cooperating with the geospatial model database module for performing at least one noise filtering operation on data comprising elevations associated with respective location points;
the at least one noise filtering operation comprising determining a respective center point elevation difference for each location point and based upon a sum of differences between elevations of a given location point and a plurality of neighboring location points.

22. The computer-readable medium of claim 21 wherein the data comprises ground data and foliage data.

23. The computer-readable medium of claim 22 further comprising separating the ground data from the foliage data based upon the at least one noise filtering operation.

24. The computer-readable medium of claim 21 wherein the at least one noise filtering operation comprises a first loose tolerance filtering to determine an inclusive estimate of building locations, and a second strict tolerance filtering to reduce false building locations.

25. The computer-readable medium of claim 24 wherein the processing module further performs at least one edge recovery operation to compensate for noisy building perimeters.

26. The computer-readable medium of claim 24 wherein the processing module further performs a masking operation based upon the inclusive estimate of the building locations to generate masked building data.

27. The computer-readable medium of claim 26 wherein the at least one noise filtering operation further comprises a third filtering based upon the masked building data and the output of the second strict tolerance filtering.

28. The computer-readable medium of claim 21 wherein the at least one sum of differences operation further comprises determining a respective neighboring points elevation difference for each pair of adjacent location points based upon a sum of differences between elevations of respective center point elevation differences for the adjacent location points.

29. The computer-readable medium of claim 21 wherein the at least one noise filtering operation further comprises selectively replacing foliage and building data points with nulls based upon the at least one sum of differences operation and an elevation difference threshold.

* * * * *